United States Patent
Bierl et al.

(10) Patent No.: US 7,461,537 B2
(45) Date of Patent: Dec. 9, 2008

(54) DEVICE AND METHOD FOR CALIBRATION OF A MASS FLOW SENSOR

(75) Inventors: Rudolf Bierl, Regensburg (DE); Manfred Schweimeier, Kammeltal/Ettenbeuren (DE)

(73) Assignee: Siemens Aktiengesellschaft, Munich (DE)

( * ) Notice: Subject to any disclaimer, the term of this patent is extended or adjusted under 35 U.S.C. 154(b) by 361 days.

(21) Appl. No.: 10/526,316

(22) PCT Filed: Aug. 8, 2003

(86) PCT No.: PCT/DE03/02674

§ 371 (c)(1), (2), (4) Date: Nov. 1, 2005

(87) PCT Pub. No.: WO2004/027354

PCT Pub. Date: Apr. 1, 2004

(65) Prior Publication Data

US 2006/0150708 A1    Jul. 13, 2006

(30) Foreign Application Priority Data

Sep. 12, 2002    (DE) ................ 102 42 377

(51) Int. Cl.
  *G01F 25/00* (2006.01)
  *G01F 1/20* (2006.01)
(52) U.S. Cl. ............ 73/1.26; 73/1.16; 73/1.25; 73/1.35; 73/861.61; 73/861.62; 73/861.63
(58) Field of Classification Search ................ 73/1.16, 73/1.25, 1.26, 1.35, 861.61, 861.62, 861.63
See application file for complete search history.

(56) References Cited

U.S. PATENT DOCUMENTS

| | | | |
|---|---|---|---|
| 3,204,459 A * | 9/1965 | Lehrer .................. 73/861.63 |
| 3,524,344 A | 8/1970 | Converse, III et al. |
| 3,896,670 A * | 7/1975 | Converse et al. ......... 73/861.63 |
| 4,027,523 A | 6/1977 | St. Clair |
| 4,753,114 A * | 6/1988 | Jones et al. .................. 73/861 |
| 4,823,591 A * | 4/1989 | Lewis ........................ 73/1.26 |
| 5,003,810 A * | 4/1991 | Jepson et al. ................ 73/196 |
| 5,299,447 A | 4/1994 | Caron |
| 5,307,667 A * | 5/1994 | Caron ....................... 73/1.26 |
| 5,554,805 A * | 9/1996 | Bahrton ..................... 73/202 |
| 5,880,378 A * | 3/1999 | Behring, II ............... 73/861.53 |
| 6,405,577 B2 * | 6/2002 | Hanashiro et al. .......... 73/23.31 |
| 2002/0157448 A1 | 10/2002 | Hirai et al. |

FOREIGN PATENT DOCUMENTS

| | | |
|---|---|---|
| DE | 198 24 098 A1 | 12/1999 |
| DE | 198 57 329 A1 | 6/2000 |
| DE | 101 49 292 A1 | 8/2003 |
| FR | 2 580 803 A1 | 10/1986 |
| JP | 2002071433 | 8/2002 |

* cited by examiner

*Primary Examiner*—David A. Rogers
(74) *Attorney, Agent, or Firm*—Lucas & Mercanti, LLP

(57) ABSTRACT

A device and method for calibration of a mass flow sensor (14) employs a flow channel and a holder for the mass flow sensor in the flow channel. An adjustable throttle device is provided between the holder and a connection to a pump during a calibrating operation to operate on the basis of a predetermined time/displacement profile by means of a control device. During operation of the pump, the throttle device generates a supercritical flow with which a flowing medium has the speed of sound in the narrowest cross section of the throttle device.

6 Claims, 2 Drawing Sheets

DEVICE AND METHOD FOR CALIBRATION OF A MASS FLOW SENSOR

FIELD AND BACKGROUND OF THE INVENTION

The invention relates to a device and a method for calibration of a mass flow sensor. The device is occasionally also referred to as a flow bench.

The combustion process in an internal combustion engine depends quite decisively on the amount of air that is supplied. Therefore, mass flow sensors which sense the mass of a flowing gas are used. The sensed measuring signal in the form of a current and voltage value or a period duration value in the case of clocked signals is subsequently assigned a value for the mass flow, for example in kilograms/hour. In order that the sensed measuring signals correctly reproduce the mass flowing past, it is necessary to calibrate the mass flow sensor.

DE 198 57 329 A1 discloses a flow bench and a method for the testing and calibration of a mass flow sensor. In the case of the flow bench, a mass flow sensor to be calibrated and a reference mass flow sensor are arranged one behind the other in a flow channel. A pump generates an air mass flow in the flow channel, the two mass flow sensors being positioned upstream of a throttle valve. A position downstream is also possible. A controller sets the throttle valve in the flow channel, so that the mass flow varies in intensity. The measured values of the reference mass flow sensor are used to determine the values for the mass flow sensor to be calibrated. In the determination of the values for the mass flow sensor to be calibrated, pressure losses at the upstream sensor must be taken into account.

In the not yet published German patent application DE 101 49 292.8, a description is given of operating without a reference mass flow sensor. In this case, a mass flow/time profile is preset in the flow channel by means of a standard valve. The mass flow sensor to be calibrated is calibrated in the air mass flow set by the standard valve on the basis of a predetermined mass/time profile. A disadvantage of this method, also referred to as masterless calibration, is that the temperature and pressure profiles on the suction side of the pump must be kept absolutely constant. Any changes caused by the ambient temperature and/or the ambient pressure may falsify the values of the calibration.

SUMMARY OF THE INVENTION

The invention is based on the object of providing a device and a method for calibration of a mass flow sensor which avoid the aforementioned disadvantages and allow the calibration of the mass flow sensor to be carried out particularly quickly and reliably.

The underlying object is achieved by a device for calibration of a mass flow sensor with the features from claim 1. Advantageous configurations of the device according to the invention are the subject of the subclaims.

The device according to the invention has a flow channel and a holder for a mass flow sensor to be calibrated in the flow channel. The flow channel is connected at one end to a pump which pumps gas, in particular air, through the flow channel. An adjustable throttle device is provided between the holder and the pump.

The throttle device is designed in such a way that, when the pump is being operated, a flow is generated at the speed of sound in the narrowest cross section of the throttle device. A control device adjusts the throttle device during the calibrating operation according to a predetermined time/displacement profile. The adjustable throttle device is operated in supercritical operation, in that a specific pressure ratio between the inlet pressure and the pressure on the suction side is achieved. In supercritical operation of the throttle device it is the case that the speed in the narrowest cross section of the nozzle does not change when there is a change in the pressure on the suction side, and consequently the mass flow through the throttle device remains constant. There is no longer any need for monitoring of the pressure on the suction side.

In a preferred configuration, the adjustable throttle device is a variable nozzle. It has been found to be an advantage that, for a super critically operated nozzle, the mass flow can be calculated very accurately from pressure, temperature and relative atmospheric humidity.

In a particularly preferred configuration, a variable nozzle has a conically widening portion and a spike which is arranged in the portion and the position of which is adjustable by means of a drive in the portion, in order to change the free cross section in the portion. The spike preferably has in this case the form of a cone or a truncated cone, which is arranged centrally in the portion. The spike is preferably adjustable along its longitudinal axis by means of the drive.

Sensors for sensing state variables of the mass flow are arranged between the air mass sensor and the throttle device. These are sensors for temperature, relative atmospheric humidity and pressure. These values are used to determine the mass flow passing through.

The object according to the invention is likewise achieved by a method with the features from further claims. A preferred development of the method according to the invention is also disclosed.

In a first step of the method according to the invention, a mass flow sensor to be calibrated is arranged in the flow channel. A mass flow varying in its values over time is generated in the flow channel. The mass flow, which is specified for example in the units of kilograms/hour, changes in the flow channel. Additionally provided in the flow channel is a throttle device, which is flowed through at the speed of sound in the narrowest cross section. In comparison with the conventional ramp flow bench, pressure and temperature on the suction side have no bearing here, so that the calibration becomes more stable and can be performed more quickly. In addition to this there is the fact that the method according to the invention is to the greatest extent independent of the stability of the pump suction capacity.

In a preferred development of the method according to the invention, an adjustable nozzle which makes the mass flow pass with predetermined values by the mass flow meter to be calibrated is provided as the throttle device.

Apart from the calibration described above, the invention can also be used for checking and/or diagnosis of the mass flow sensors.

BRIEF DESCRIPTION OF THE DRAWING

A preferred configuration of the invention is explained in more detail below on the basis of the figures, in which.

DETAILED DESCIPTION OF THE PERFERRED EMBODIMENT(S)

Figure 1:
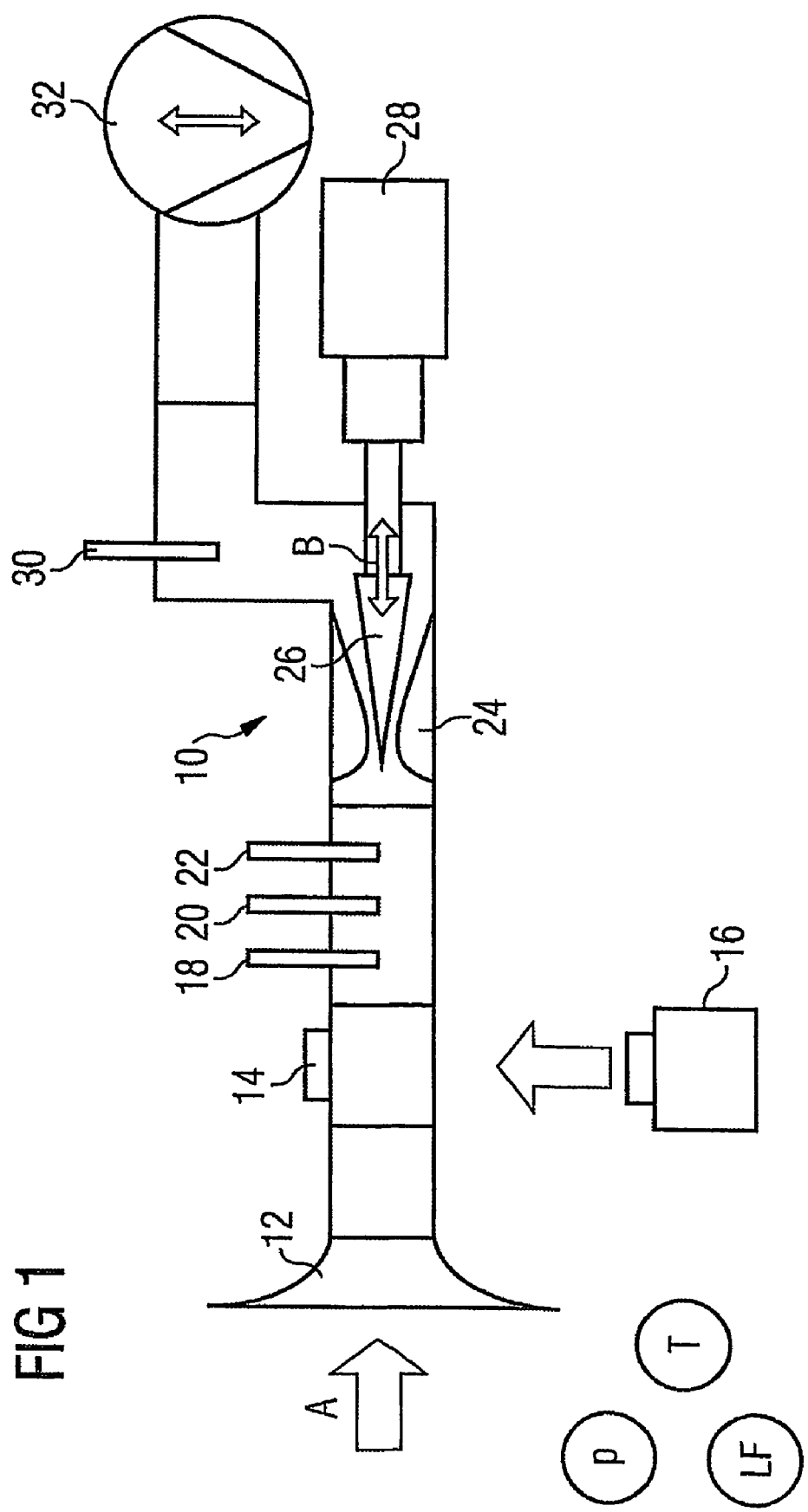
FIG. 1 shows a flow bench in a schematic view.

FIG. 1 shows a flow bench 10 in a schematic view. Air enters the flow bench in the direction of flow A via a funnel-shaped receiving opening 12. Downstream of the inlet opening 12, the head of a plug-in air mass sensor can be seen, the measuring region of which is bathed in the stream of air. However, the flow bench is not in any way restricted to plug-in air mass sensors, but rather any desired air mass sensors can be calibrated in the flow channel. For this, the air mass sensor to be calibrated may for example be placed in the flow channel while already fitted together with a sectional tube 16.

Further downstream, sensors for temperature 18, relative atmospheric humidity 20 and pressure 22 are provided. Downstream of the sensors there is an adjustable nozzle 24. The nozzle represented in FIG. 1 is a so-called laval nozzle, the flow conditions of which can be analyzed particularly well. Once the speed of sound is reached in the narrowest cross section, the outflow quantity is not influenced even by lowering of the pressure on the suction side (downstream of the nozzle). The outflow quantity is also not influenced by rising of the pressure on the suction side, as long as supercritical operation is maintained. If the laval nozzle 24 is operated in the supercritical range, the outflow quantity of the nozzle impinging on the mass flow sensor to be calibrated is independent of fluctuations in the pump delivery capacity, as long as the critical pressure ratio is not exceeded.

The mass flow through the nozzle 24 is dynamically set by means of a spike 26, which can be made to move along the direction of the double-headed arrow B. The spike 26 is set by means of the drive 28, which is activated by the control device (not represented). On the suction side, a pressure sensor 30 is provided in the flow channel. The pressure sensor 30 together with the pressure sensor 22 makes it possible to establish which pressure ratio is present at the nozzle 24 and to conclude from this whether supercritical operation has already been reached. The air flow through the flow channel is generated by the pump 32.

During the calibration of the air mass sensor 14, the setting of the spike 26 is changed on the basis of a predetermined time/displacement profile. The change takes place continuously. Since, in the supercritical range, the mass flow from the nozzle 24 is independent of the pressure on the suction side, the mass flow sensor 14 to be calibrated can be calibrated and/or checked particularly reliably.

Figure 2:
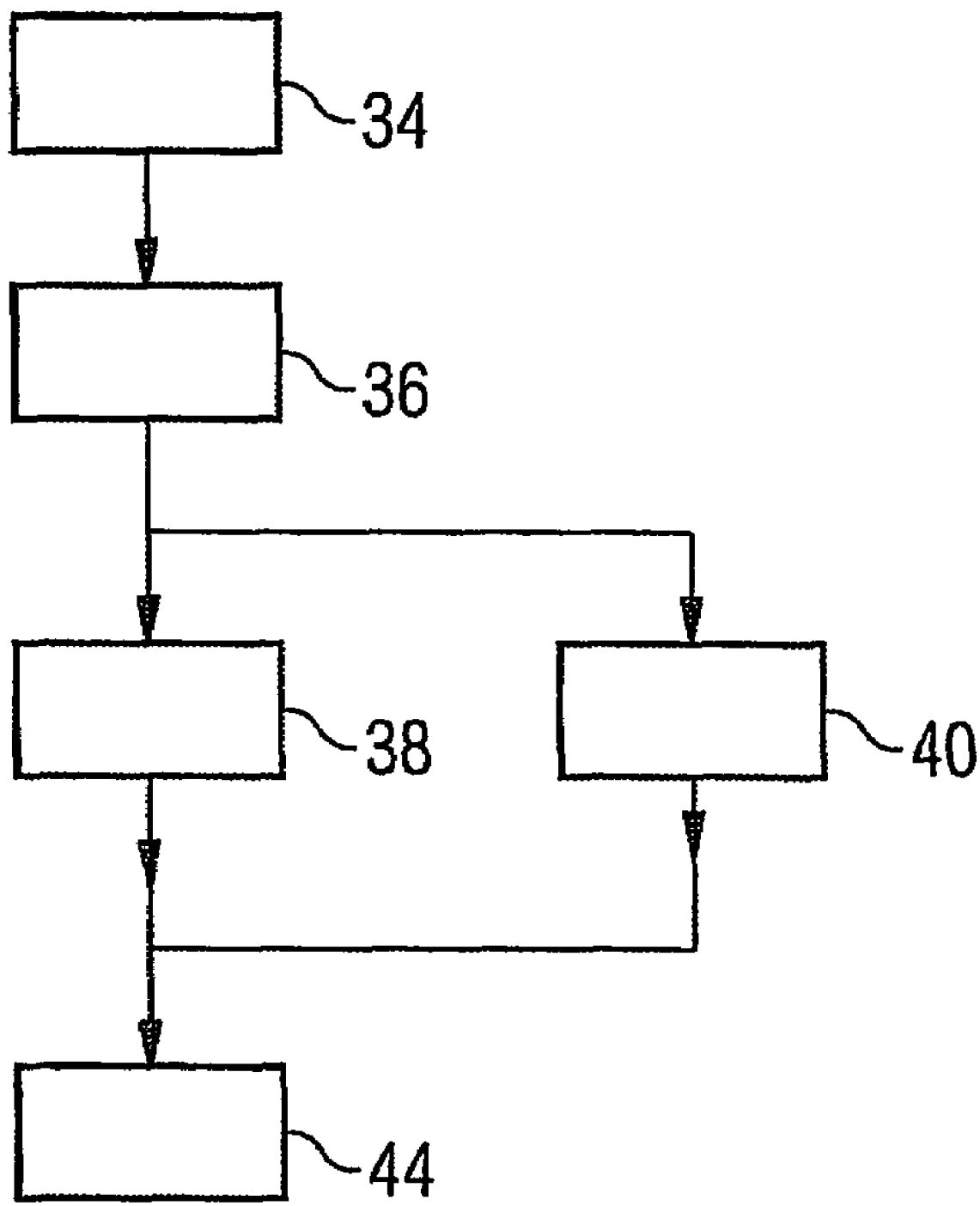
FIG. 2 shows a flow diagram of the method according to the invention.

FIG. 2 shows the individual method steps of the method according to the invention. In step 34, the sensor to be calibrated is inserted into the flow channel. In step 36, a flow through the nozzle is built up. In step 38, the spike 26 is pulled out continuously on the basis of a predetermined displacement/time profile, which fixes the mass flow/time profile through the nozzle. At the same time, in step 40, the measuring signals of the mass flow sensor to be calibrated are sensed.

The invention claimed is:

1. A method for calibrating an air mass sensor, comprising the steps of:
  a) arranging a mass flow sensor to be calibrated in a flow channel which comprises a pump at one end and an inlet opening for a gas which is conveyed through the flow channel with the aid of the pump at its other end; a variable nozzle located between the mass flow sensor and the pump, said nozzle having a conically widening portion and a spike which is arranged in the portion and which can be adjusted in the portion by means of an actuator in order to change the free cross section in the portion, and the spike of said nozzle being continuously adjustable during a calibrating operation on the basis of a predetermined time/displacement profile by means of a control device;
  b) generating a mass flow, corresponding to a mass flow/time profile, in the flow channel on the basis of the predetermined time/displacement profile of the control device;
  c) continuously adjusting the position of the spike of the variable nozzle in accordance with the time/displacement profile in such a manner that a flow with the speed of sound is generated at the narrowest cross section of the variable nozzle during operation of the pump; and
  d) measuring, using the air mass flow sensor, the flow conditions in order to calibrate the air mass flow sensor.

2. The method according to claim 1, wherein the flow conditions comprise temperature, relative atmospheric humidity, and/or pressure 3. The method according to claim 1, wherein the spike has the form of a cone or truncated cone which is arranged centrally in the portion.

4. The method according to claim 3, wherein the flow conditions comprise temperature, relative atmospheric humidity, and/or pressure.

5. The method according to claim 3, wherein the spike's position is adjustable along a longitudinal axis.

6. The method according to claim 5, wherein the flow conditions comprise temperature, relative atmospheric humidity, and/or pressure.

* * * * *